(12) United States Patent
Yamanaka et al.

(10) Patent No.: US 6,393,826 B1
(45) Date of Patent: May 28, 2002

(54) GAS TURBINE

(75) Inventors: Kazunori Yamanaka, Hitachi; Satoshi Kondou; Masami Noda, both of Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/643,751

(22) Filed: Aug. 23, 2000

(30) Foreign Application Priority Data

Feb. 25, 2000 (JP) ........................................ 2000-054379

(51) Int. Cl.$^7$ ................................ F02C 6/08; F02C 7/18
(52) U.S. Cl. ...................... 60/39.07; 60/39.141; 60/726; 60/728
(58) Field of Search ...................... 60/39.07, 39.141, 60/39.142, 39.75, 726, 728

(56) References Cited

U.S. PATENT DOCUMENTS

| | | | | |
|---|---|---|---|---|
| 3,901,026 A | * | 8/1975 | Quinn ........................ | 60/39.15 |
| 4,767,259 A | * | 8/1988 | Kurosawa et al. ............. | 415/17 |
| 5,054,996 A | * | 10/1991 | Carreno ..................... | 415/115 |
| 5,063,963 A | * | 11/1991 | Smith ........................ | 60/39.07 |
| 5,185,997 A | * | 2/1993 | Nishijima .................... | 60/39.07 |
| 5,782,076 A | * | 7/1998 | Huber et al. ................. | 60/39.75 |
| 5,992,139 A | * | 11/1999 | Kesseli ...................... | 60/39.183 |
| 6,050,080 A | * | 7/2000 | Horner ....................... | 60/39.07 |

FOREIGN PATENT DOCUMENTS

JP          4-214931        8/1992

* cited by examiner

*Primary Examiner*—Ted Kim
(74) *Attorney, Agent, or Firm*—Mattingly, Stanger & Malur, P.C.

(57) ABSTRACT

A gas turbine has a cooling air system supplying air for cooling a high temperature part of the gas turbine and a spray air system supplying air for spraying fuel into a combustor and is formed so that a part of high-pressure air compressed by a gas turbine compressor is used as air of the cooling air system and spray air system, wherein a heat exchanger and a boost compressor are arranged downstream of the outlet of compressed air of the gas turbine compressor, and the boost compressor is composed of a parallel connection of a compressor driven by the turbine shaft and ae compressor driven by a driven source other than the turbine shaft, and pressurized air from the boost compressor is used as air for the cooling air system and the spray air system.

12 Claims, 3 Drawing Sheets

GAS TURBINE

BACKGROUND OF THE INVENTION

The present invention relates to a gas turbine and more particularly to a gas turbine formed so that a part of high-pressure air compressed by a gas turbine compressor is used as air for a cooling air system and a spray air system.

As countermeasures for a recent increase in demands of power and global warming, realization of large capacity and high efficiency of gas turbine power generating equipment is required. Particularly, in gas turbine power generating equipment leading air compressed by a compressor to a combustor, supplying fuel to burn it with the air, and driving the gas turbine by its combustion gas, large capacity and high efficiency can be realized by increasing the combustion temperature more.

However, in a heat recovery type gas turbine, that is, a gas turbine for recovering energy held by higher-temperature combustion gas, there is the possibility that damage may be caused to parts exposed at a high temperature without cooling and developed to a serious accident. Therefore, in gas turbine power generating equipment in which a combustion gas temperature is high, the high-temperature part of the gas turbine is cooled using compressed air or vapor as a cooling medium.

On the other hand, when oil such as light oil is to be used as fuel, spray air for spraying fuel into a combustor is necessary. A conventional spray air system adjusts the air temperature by a heat exchanger using a part of air discharged from a compressor, pressurizes it by the compressor to air of higher pressure than air for combustion, produces clean air by letting it pass through a filter so as to prevent the fuel nozzle from clogging, then supplies air to the combustor and uses it to spray fuel.

A conventional cooling air system supplies air extracted by the compressor to the high-temperature part of the turbine directly or after it passes through the heat exchanger for temperature adjustment. In this case, in a gas turbine which uses a part of air discharged from the compressor for cooling the turbine blades so as to improve the turbine efficiency and then recovers it into the combustor, a heat exchanger for keeping cooling air at an appropriate temperature and a filter and a mist separator for making cooling air more clean are installed.

A system constitution for cooling air discharged from the compressor by the heat exchanger, cooling the high-temperature part of the turbine, and also using it as fuel spray air, is disclosed, for example, in Japanese Patent Application Laid-Open 4-214931 and its equivalent, Nishijima U.S. Pat. No. 5,185,997.

In a gas turbine formed as mentioned above, that is, a gas turbine having a fuel oil spray air system and a cooling air system in common and formed so that a boost compressor is driven by the turbine shaft from the viewpoint of reliability of cooling air supply, the number of revolutions of the turbine at start is small, so that the discharge pressure of the boost compressor is insufficient and hence at start, an air system for compensating for it is necessary.

SUMMARY OF THE INVENTION

The present invention was developed in view of the foregoing and is to provide a gas turbine which sufficiently supplies, even at start, high-pressure air to a fuel oil spray air system and a cooling air system.

Namely, the present invention is intended to accomplish the expected object in a gas turbine which has a cooling air system supplying air for cooling the high-temperature part of the gas turbine and a spray air system supplying air for spraying fuel into a combustor and is formed so that a part of high-pressure air compressed by a gas turbine compressor is used as air for the cooling air system and spray air system, and in which a heat exchanger and a boost compressor are arranged downstream of the outlet side of compressed air of the gas turbine compressor, the boost compressor is constructed by a parallel connection of a compressor driven by the turbine shaft and a compressor driven by a drive source other than the turbine shaft, and pressurized air from the boost compressor is used as air for the cooling air system and the spray air system.

Furthermore, the present invention is intended, in a gas turbine which has a cooling air system supplying air for cooling the high-temperature part of the gas turbine and a spray air system supplying air for spraying fuel into a combustor and is formed so that a part of high-pressure air compressed by a gas turbine compressor is used as air for the cooling air system and spray air system, in which a heat exchanger and a boost compressor are arranged downstream of the outlet side of compressed air of the gas turbine compressor, the boost compressor is constructed by a parallel connection of a compressor driven by the turbine shaft and a compressor which is driven by a drive source other than the turbine shaft and operated when the gas turbine is started, and pressurized air from the boost compressor is used as air for the cooling air system and the spray air system.

In this case, between the compressor driven by the turbine shaft and the compressor driven by a drive source other than the turbine shaft, a switching means for switching to the spray air system is installed. On the output side of high-pressure air of the compressor driven by the turbine shaft and the compressor driven by a drive source other than the turbine shaft, a check valve is installed. In the spray air system on the output side of high-pressure air of the boost compressor, a heat exchanger for cooling spray air is installed. On the output side of high-pressure air of the boost compressor, a pressure adjustment device adjusting the outlet pressure is installed. The compressor driven by a drive source other than the turbine shaft is a compressor driven by a motor or a compressor driven by an internal combustion engine.

Namely, in a gas turbine formed as mentioned above, a heat exchanger and a boost compressor are arranged on the downstream side on the outlet side of compressed air of the gas turbine compressor, and the boost compressor is constructed by a parallel connection of a compressor driven by the turbine shaft and a compressor driven by a drive source other than the turbine shaft, and pressurized air from the boost compressor is used as air for the cooling air system and the spray air system, so that at start, the boost compressor driven by a drive source other than the turbine shaft is operated, and fuel oil spray air and cooling air are supplied, and hence even at start, appropriate high-pressure air can be supplied to the fuel oil spray system and cooling system.

DESCRIPTION OF THE EMBODIMENTS OF THE INVENTION

Figure 1:
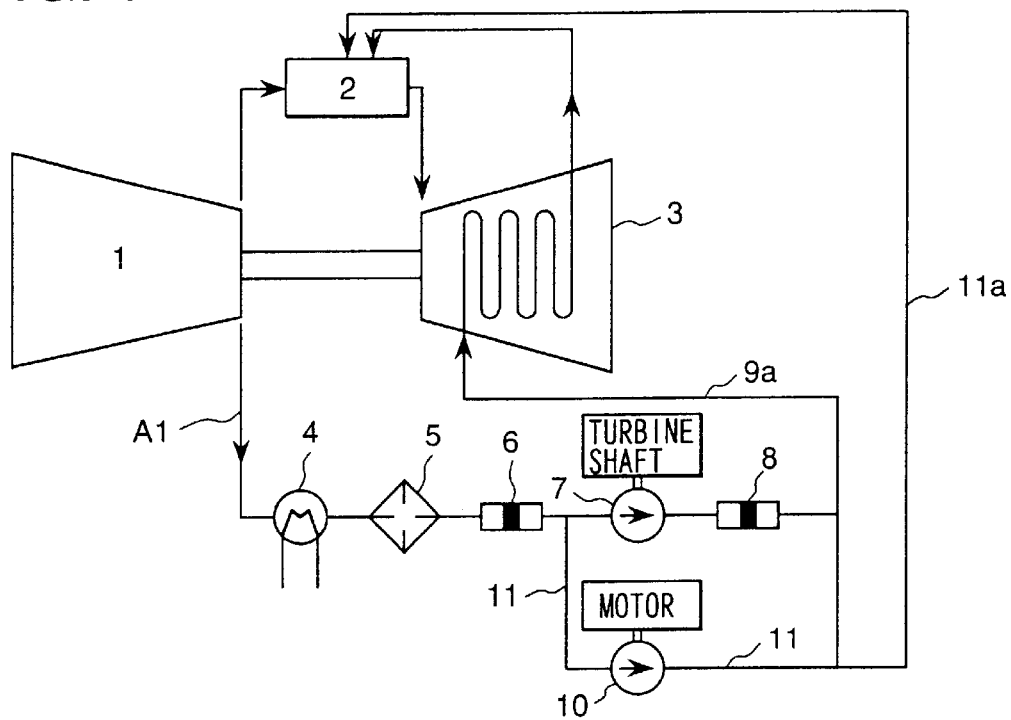
FIG. 1 is a schematic view showing an embodiment of a gas turbine of the present invention.

The present invention will be explained in detail hereunder on the basis of the embodiments shown in the accompanying drawings. In FIG. 1, a gas turbine system of an embodiment of the present invention is shown. Numeral 1 indicates a compressor, 2 a combustor, 3 turbine, 7 a first boost compressor driven by the turbine shaft, 10 a second boost compressor driven by a motor or an internal-combustion engine, that is, which is a drive source other than the turbine shaft (an example of a case of a boost compressor driven by the motor will be explained hereunder), 9a a high-temperature part cooling air system, and 11a a fuel oil spray air system.

Compressed air A1 on one side branched from the outlet of the gas turbine compressor 1 is cooled to an appropriate temperature by a heat exchanger 4 and then led to a mist separator 5, in which mist in the air is separated. Compressed air on the other side is directed to a line led to the combustor 2. The compressed air A1, thereafter, is led to a filter 6 from the mist separator 5 and foreign substances such as dust included in compressed air are removed. Thereafter, the compressed air is pressurized by the boost compressor 7 up to optimum pressure as fuel oil spray air and cooling air.

Also on the downstream side of the boost compressor 7 driven by the turbine shaft, a filter 8 is installed, and air to be supplied to the combustor 2 and the turbine 3 is made clean finally. A part of the compressed air adjusted to an appropriate temperature and pressure as fuel oil spray air and cooling air is supplied to the combustor 2 via the system 11a as fuel oil spray air supplied from the fuel oil system. Another part of the compressed air is supplied to the high-temperature part of the turbine as cooling air via the cooling air system 9a.

In this case, particularly, in the part of the first boost compressor 7 driven by the turbine shaft, the second boost compressor 10 which is driven by the motor and operated when the turbine is started, is installed in parallel with the boost compressor 7. By the second boost compressor 10, even at start of the turbine, fuel oil spray air and high-temperature cooling air at sufficient pressure can be supplied.

Namely, when the reliability of cooling air supply is to be improved by using the boost compressor 7 driven by the turbine shaft for driving the boost compressor as long as the turbine shaft rotates, since at start of the turbine, the number of revolutions of the turbine shaft is low, the discharge force of the boost compressor is insufficient and air cannot be used as fuel oil spray air. However, in the aforementioned constitution, at start of the turbine, a start spray air system 11 having the boost compressor 10 driven by the motor is used and by doing this, a cooling air supply system having high reliability driven the turbine shaft is obtained and also even at start, fuel spray air can be obtained.

In this case, needless to say, after the turbine is started and increases in rotational speed up to the predetermined number of revolutions, the boost compressor 10 driven by the motor is stopped and unnecessary power is reduced.

Figure 2:
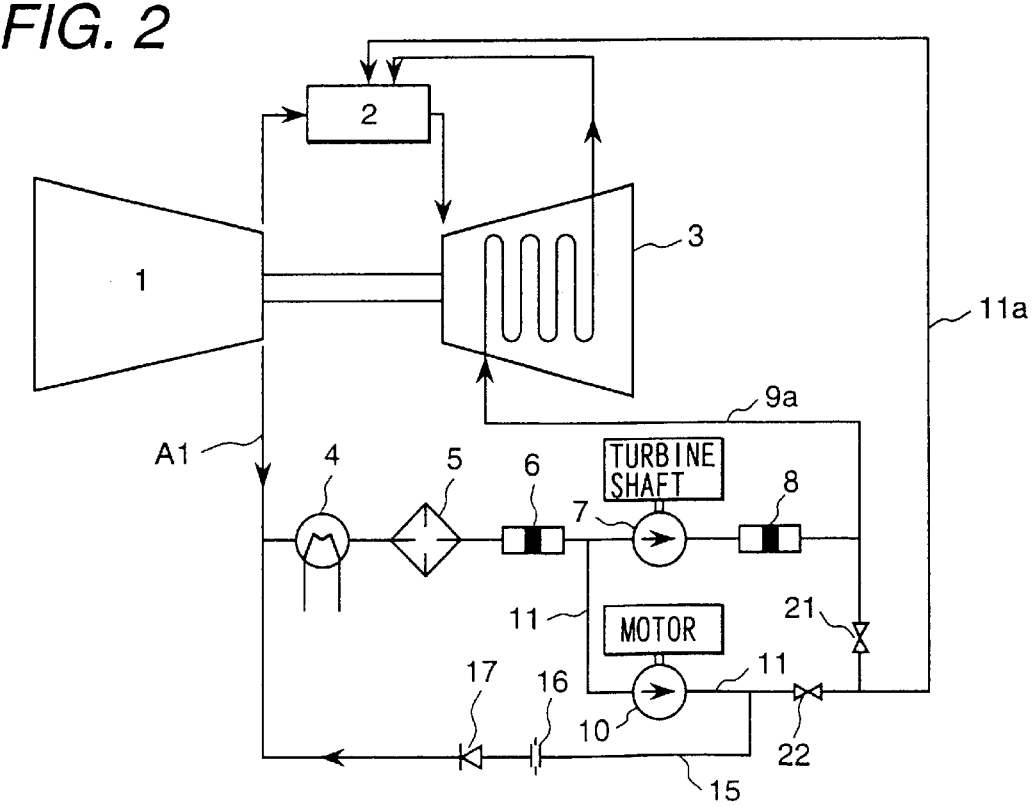
FIG. 2 is a schematic view showing another embodiment of a gas turbine of the present invention.

FIG. 2 shows the second embodiment of the present invention and in this case, for the boost compressors 7 and 10, valves 21 and 22 for switching the boost compressors 7 and 10 driven by the turbine shaft and motor respectively to be used are installed. By doing this, at start, the pressure at the outlet of the boost compressor 7 driven by the turbine shaft is monitored and when the discharge pressure becomes sufficiently high, the system can be switched from the boost compressor 10 driven by the motor for starting to the boost compressor 7 driven by the turbine shaft.

On the air outlet side of the start spray air system 11, a bypass system 15 is installed. In the bypass system 15, a check valve 17 for preventing the boost compressor 10 from damage due to back flow of air in the bypass system when the boost compressor 10 driven by the motor is stopped and an orifice 16 for reducing the pressure of the bypass system 15 are installed.

Figure 3:
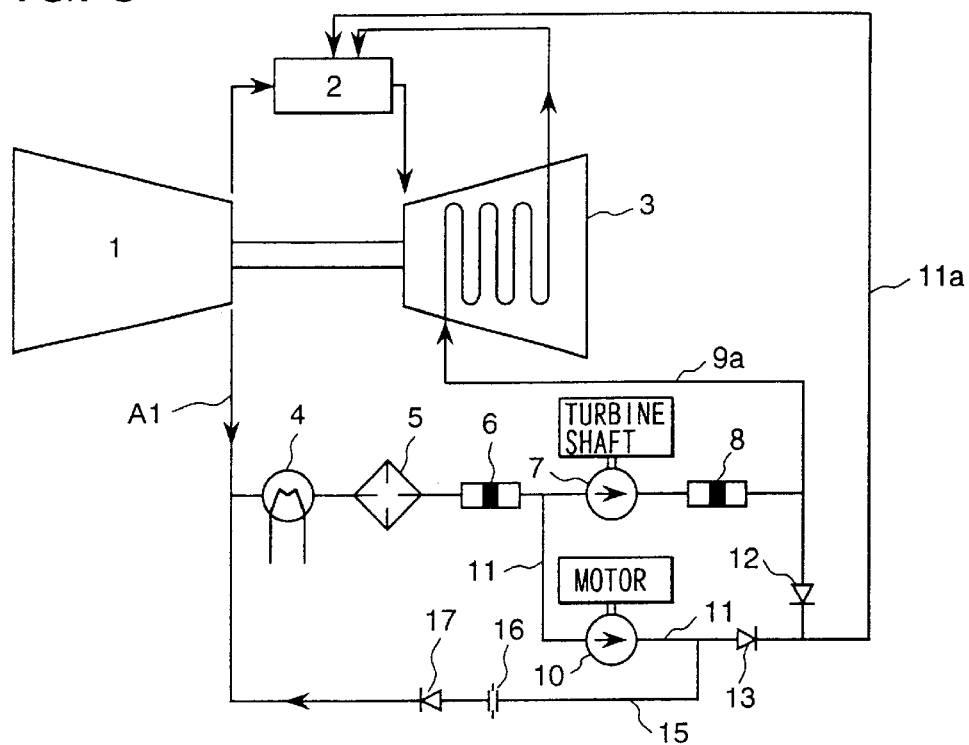
FIG. 3 is a schematic view showing another embodiment of a gas turbine of the present invention.

In FIG. 3, the third embodiment is shown. On the outlet sides of the boost compressors driven by the turbine shaft and motor, check valves 12 and 13 are installed, respectively. By doing this, when the turbine is started, fuel oil spray air is supplied to the combustor 2 by the boost compressor 10 driven by the motor, though as the number of revolutions of the turbine increases, the discharge pressure of the boost compressor 7 driven by the turbine shaft increases and becomes higher than the pressure of the boost compressor 10 driven the motor, so that by the balance in the discharge pressure between the boost compressor driven by the turbine shaft and the boost compressor driven the motor, the spray air supply system to the boost compressor 7 driven by the turbine shaft or to the combustor 2 is switched. Therefore, there is no need to install a control unit for switching the system and a highly reliable and simple spray air system can be obtained.

Figure 4:
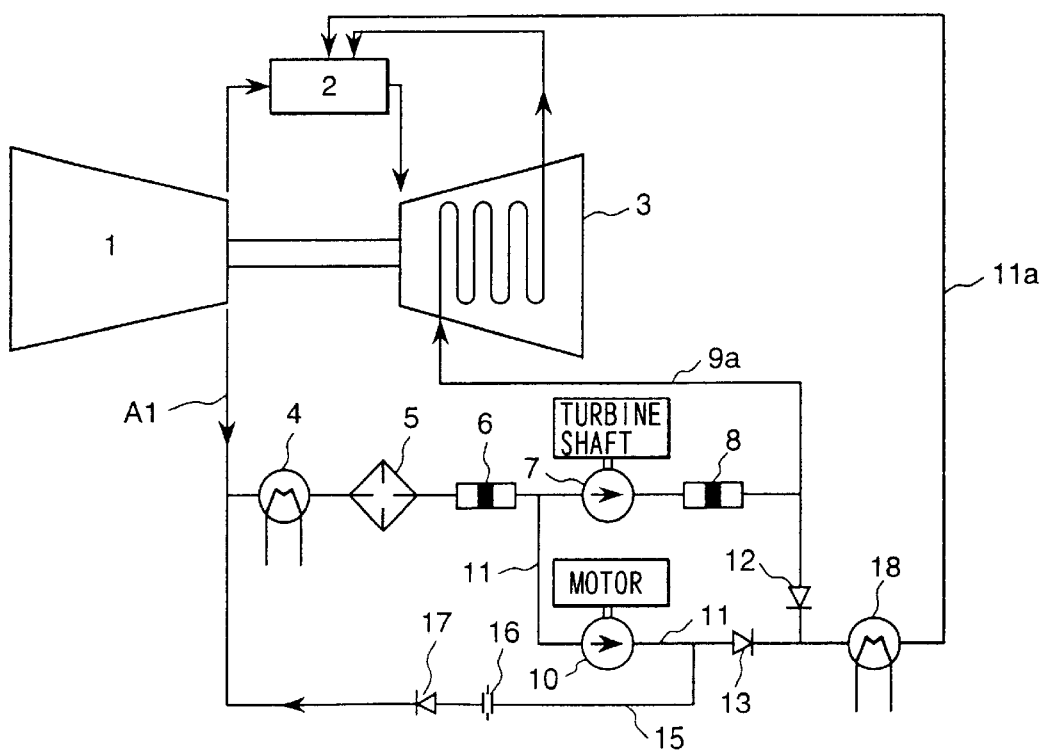
FIG. 4 is a schematic view showing another embodiment of a gas turbine of the present invention.

In the fourth embodiment, as shown in FIG. 4, a heat exchanger 18 is installed in the spray air system 11a for supplying air to the combustor 2. By doing this, even if there is a difference between the cooling air temperature required for cooling the high-temperature part of the turbine and the temperature required as fuel oil spray air, by lowering the temperature of fuel oil spray air and adjusting it to an appropriate temperature, carbonization of fuel oil due to exposure thereof to high-temperature air can be prevented.

Figure 5:
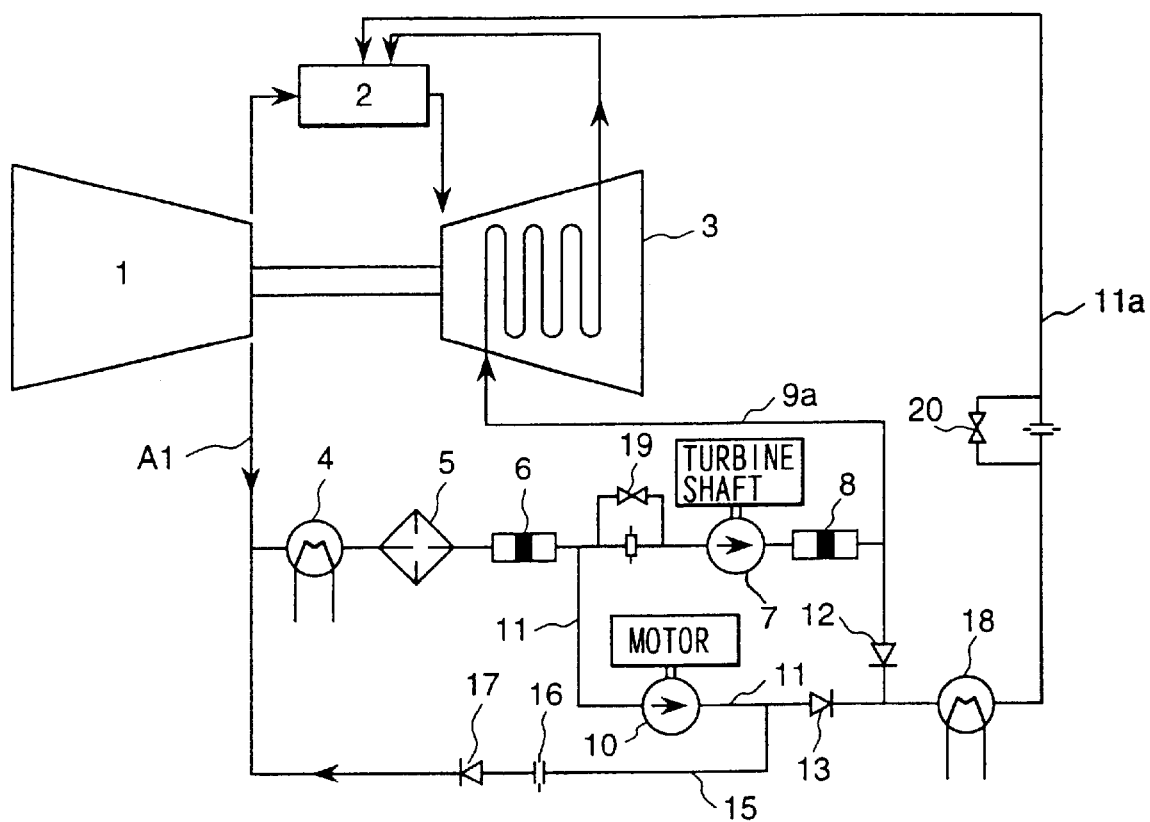
FIG. 5 is a schematic view showing another embodiment of a gas turbine of the present invention.

In the fifth embodiment, as shown in FIG. 5, a pressure adjustment valve 19 for adjusting the inlet pressure of the boost compressor 7 driven by the turbine shaft and a pressure adjustment valve 20 for adjusting the fuel oil spray air pressure are installed. In this case, in the respective pressure adjustment valves 19 and 20, bypass orifices for protection of the compressors in the closing operation that the valves are fully closed are installed in parallel. With this constitution, by monitoring each system pressure of cooling air and spray air and controlling the pressure adjustment valves, each pressure can be adjusted to each requested appropriate pressure.

When the turbine is started, fuel oil spray air is supplied to the combustor 2 by the boost compressor 10 driven by the motor. In this case, the check valve 12, since the discharge pressure of the boost compressor 10 driven by the motor is larger than the discharge pressure of the boost compressor 7 driven by the turbine shaft, is fully closed and discharged air of the boost compressor 7 driven by the turbine shaft is all supplied to the high-temperature part of the turbine as cooling air. The pressure of fuel oil spray air to be supplied to the combustor 2 is adjusted to appropriate pressure by the pressure adjustment valve 20. Surplus air from the boost compressor 10 driven by the motor, which is generated by reducing the opening of the pressure adjustment valve 20 passes through the bypass system 15, and is reduced in pressure by the orifice 16, and returned to the inlet of the heat exchanger 4.

When the discharge pressure of the boost compressor 7 driven by the turbine shaft increases as the turbine 3 speeds up, the check valve 13 is fully closed due to the balance of pressure, and discharge air of the boost compressor driven by the motor is all supplied to the bypass system 15. Thereby, fuel oil spray air is switched to discharge air of the boost compressor 7 driven by the turbine shaft. After the fuel oil spray air system is switched, the boost compressor 10 driven by the motor is stopped and unnecessary power is reduced.

With respect to cooling air of the high-temperature part of the turbine, the air temperature required for cooling air supply is considered to be higher than the optimum temperature as fuel oil spray air in consideration of thermal stress generated in the high-temperature parts of the turbine. As a result, discharge air of the boost compressor 7 driven by the turbine shaft is supplied to the heat exchanger 18 and lowered to an appropriate temperature, so that carbonization of fuel oil is prevented.

To adjust the flow rate of fuel oil spray air to be supplied to the combustor 2, fuel oil spray air is supplied to the combustor 2 via the pressure adjustment valve 20. In this case, from the viewpoint of reliability of the cooling air system, it is desirable that the pressure adjustment valve 20 is a valve which is generally enclosed totally, adjusted to necessary pressure via the orifice, supplies fuel oil spray oil to the combustor 2, and also when it breaks down, is totally enclosed.

According to this embodiment, when the turbine is started, the fuel air system for starting can be easily switched to the general spray air system.

As explained above, in a gas turbine formed like this, when turbine high-temperature part cooling air and fuel oil spray air are supplied using the boost compressor driven by the turbine shaft, at start, the boost compressor driven by the motor is driven and fuel oil spray air is supplied and hence even at start, high-pressure air appropriate to spray fuel oil can be supplied.

As explained above, according to the present invention, this kind of gas turbine which can sufficiently supply high-pressure air to the fuel oil spray air system and cooling air system even when it is started can be obtained.

What is claimed is:

1. A gas turbine, having a cooling air system supplying air for cooling a high-temperature part of said gas turbine and a spray air system supplying air for spraying fuel into a combustor, and formed so that a part of high-pressure air compressed by a gas turbine compressor is used as air for said cooling air system and said spray air system,
wherein a heat exchanger and a boost compressor are arranged downstream of an outlet side of compressed air of said gas turbine compressor, and said boost compressor is composed of a first compressor driven by a turbine shaft and a second compressor driven by a drive source other than said turbine shaft, said first and second compressors forming said boost compressor being fluidly connected in parallel downstream of said heat exchanger, said first and second compressors having, respectively, first and second parallel flow paths which are fluidly connected to each other downstream of the first and second compressors such that pressurized air from said boost compressor is used as air for said cooling air system and said spray air system.

2. A gas turbine according to claim 1 wherein between said first compressor driven by said turbine shaft and said second compressor driven by a drive source other than said turbine shaft, switching means for switching, to said spray air system, at least a part of compressed air directed from said boost compressor to said cooling air system, is installed.

3. A gas turbine according to claim 1, wherein on the output side of high-pressure air of said first compressor driven by said turbine shaft and said second compressor driven by a drive source other than said turbine shaft, a check valve is installed.

4. A gas turbine according to claim 1, wherein in said spray air system on the output side of high-pressure air of said boost compressor, a heat exchanger for cooling spray air is installed.

5. A gas turbine according to claim 1, wherein on the output side of high-pressure air of said boost compressor, pressure adjustment means for adjusting outlet pressure is installed.

6. A gas turbine according to claim 1, wherein said second compressor driven by a driven source other than said turbine shaft is a compressor driven by a motor or an internal-combustion engine.

7. A gas turbine according to claim 1, wherein said second compressor driven by a drive source other than said turbine shaft is a compressor driven by a motor, and on the outlet of each of said first and second compressors, a check valve is installed, and in said spray air system, a heat exchanger for cooling spray air is installed, and on the output side of high-pressure air of each of said first and second compressors, an adjustment valve for adjusting discharge pressure is installed.

8. A gas turbine, having a cooling air system supplying air for cooling a high-temperature part of said gas turbine and a spray air system supplying air for spraying fuel into a combustor, and formed so that a part of high-pressure air compressed by a gas turbine compressor is used as air for said cooling air system and said spray air system,
wherein a heat exchanger and a boost compressor are arranged downstream of an outlet side of compressed air of said gas turbine compressor, and said boost compressor is composed of a first compressor driven by a turbine shaft and a second compressor driven by a drive source other than said turbine shaft and operated when said gas turbine is started, said first and second compressors forming said boost compressor being fluidly connected in parallel downstream of said heat exchanger, said first and second compressors having, respectively, first and second parallel flow paths which are fluidly connected to each other downstream of the first and second compressors such that pressurized air from said boost compressor is used as air for said cooling air system and said spray air system.

9. A gas turbine having a turbine, a combustor and a gas turbine compressor, comprising:
a heat exchanger fluidly connected to said gas turbine compressor for heat-exchanging a part of air compressed by said gas turbine compressor;
first and second boost compressors fluidly connected in parallel downstream of said heat exchanger for compressing the air heat-exchanged by said heat exchanger, said first and second compressors having, respectively, first and second parallel flow paths which are fluidly connected to each other downstream of the first and second compressors for supplying cooling and spray air, said first boost compressor being driven by a shaft of said turbine and said second boost compressor being driven by a drive source other than said shaft of said turbine;
a cooling air system for supplying the air compressed by said first or second boost compressor to a high-temperature portion of said turbine and leading the air from said turbine into said combustor; and a spray air system for supplying the air compressed by said first or second boost compressor to said combustor as fuel spraying air.

10. A gas turbine having a turbine, a combustor and a gas turbine compressor, comprising:

a heat exchanger fluidly connected to said gas turbine compressor for exchanging heat with a part of air compressed by said gas turbine compressor;

first and second boost compressors for compressing the air heat-exchanged by said heat exchanger, said first and second boost compressors being arranged and connected in parallel downstream of an air passage through which air from said heat exchanger is supplied to said first and second boost compressors, said first and second boost compressors having, respectively, first and second parallel flow paths which are fluidly connected to each other downstream of the first and second compressors for supplying cooling and spray air, and said first boost compressor being driven by a shaft of said turbine and said second boost compressor being driven by a drive source other than said shaft of said turbine;

a cooling air system for supplying the air compressed by said first or second boost compressor to a high-temperature portion of said turbine and leading the air from said turbine into said combustor; and a spray air system for supplying the air compressed by said first or second boost compressor to said combustor as fuel spraying air.

11. A gas turbine having a turbine, a combustor and a gas turbine compressor, comprising:

a heat exchanger fluidly connected to said gas turbine compressor for heat-exchanging a part of air compressed by said gas turbine compressor;

first and second boost compressors fluidly connected in parallel downstream of said heat exchanger for compressing the air heat-exchanged by said heat exchanger, said first and second boost compressors having, respectively, first and second parallel flow paths which are fluidly connected to each other downstream of the first and second compressors for supplying cooling and spray air, said first boost compressor being connected to a shaft of said turbine to be driven thereby and said second boost compressor being connected to a drive source other than said shaft of said turbine so as to be driven thereby when said turbine starts;

a cooling air system for supplying the air compressed by said first or second boost compressor to a high-temperature portion of said turbine and leading the air from said turbine into said combustor; and a spray air system for supplying the air compressed by said first or second boost compressor to said combustor as fuel spraying air.

12. A gas turbine having a turbine, a combustor and a gas turbine compressor, comprising:

a heat exchanger fluidly connected to said gas turbine compressor for exchanging heat with a part of air compressed by said gas turbine compressor;

first and second boost compressors for compressing the air heat-exchanged by said heat exchanger, said first and second boost compressors being arranged and connected in parallel downstream of an air passage through which air from said heat exchanger is supplied to said first and second boost compressors, said first and second boost compressors having, respectively, first and second parallel flow paths which are fluidly connected to each other downstream of the first and second compressors for supplying cooling and spray air, and said first boost compressor being driven by a shaft of said turbine and said second boost compressor being connected to a drive source other than said shaft of said turbine so as to be driven thereby when said turbine starts;

a cooling air system for supplying the air compressed by said first or second boost compressor to a high-temperature portion of said turbine and leading the air from said turbine into said combustor; and a spray air system for supplying the air compressed by said first or second boost compressor to said combustor as fuel spraying air.

* * * * *